United States Patent
Kogure et al.

(10) Patent No.: US 12,132,877 B2
(45) Date of Patent: Oct. 29, 2024

(54) WEB BROWSING SYSTEM, COMMUNICATION TERMINAL, IMAGE GENERATION SERVER

(71) Applicant: CANON KABUSHIKI KAISHA, Tokyo (JP)

(72) Inventors: Takeshi Kogure, Kanagawa (JP); Anna Hosaka, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/355,986

(22) Filed: Jul. 20, 2023

(65) Prior Publication Data
US 2024/0040049 A1    Feb. 1, 2024

(30) Foreign Application Priority Data

Jul. 26, 2022 (JP) ................................ 2022-118398

(51) Int. Cl.
| | |
|---|---|
| *G06F 3/12* | (2006.01) |
| *H04L 67/563* | (2022.01) |
| *H04L 67/568* | (2022.01) |
| *H04N 1/00* | (2006.01) |

(52) U.S. Cl.
CPC ....... *H04N 1/00824* (2013.01); *H04L 67/563* (2022.05); *H04L 67/568* (2022.05); *H04N 1/00464* (2013.01)

(58) Field of Classification Search
None
See application file for complete search history.

(56) References Cited

U.S. PATENT DOCUMENTS

| | | | |
|---|---|---|---|
| 2010/0050089 A1* | 2/2010 | Kim | H04L 67/5651 715/749 |
| 2012/0194826 A1* | 8/2012 | Kunori | G06F 16/957 358/1.15 |
| 2016/0162107 A1* | 6/2016 | Kunori | G06F 3/0488 345/173 |
| 2016/0381115 A1* | 12/2016 | Fujisawa | H04L 67/02 709/203 |
| 2017/0024065 A1* | 1/2017 | Kunori | G06F 3/0482 |
| 2017/0243565 A1* | 8/2017 | Kunori | G09G 5/391 |
| 2019/0079640 A1* | 3/2019 | Page | G06F 16/957 |
| 2019/0107979 A1* | 4/2019 | Mihira | G06F 3/1286 |
| 2022/0066810 A1 | 3/2022 | Ikeda | |

FOREIGN PATENT DOCUMENTS

JP        2022041717 A      3/2022

* cited by examiner

*Primary Examiner* — Dung D Tran
(74) *Attorney, Agent, or Firm* — Canon U.S.A., Inc. IP Division

(57) ABSTRACT

A Web browsing system including a cloud browser system, an image generation server and an image forming apparatus, the Web browsing system includes one or more memories and one or more processors. The one or more processors and the one or more memories are configured to create a tunnel between the image forming apparatus and the image generation server in such a manner that the image generation server is able to perform communication via a virtual proxy provided by the image forming apparatus, and download, to the image generation server, the Web content from a Web server via the tunnel and provide a result of rendering based on the Web content from the image generation server to the image forming apparatus.

13 Claims, 13 Drawing Sheets

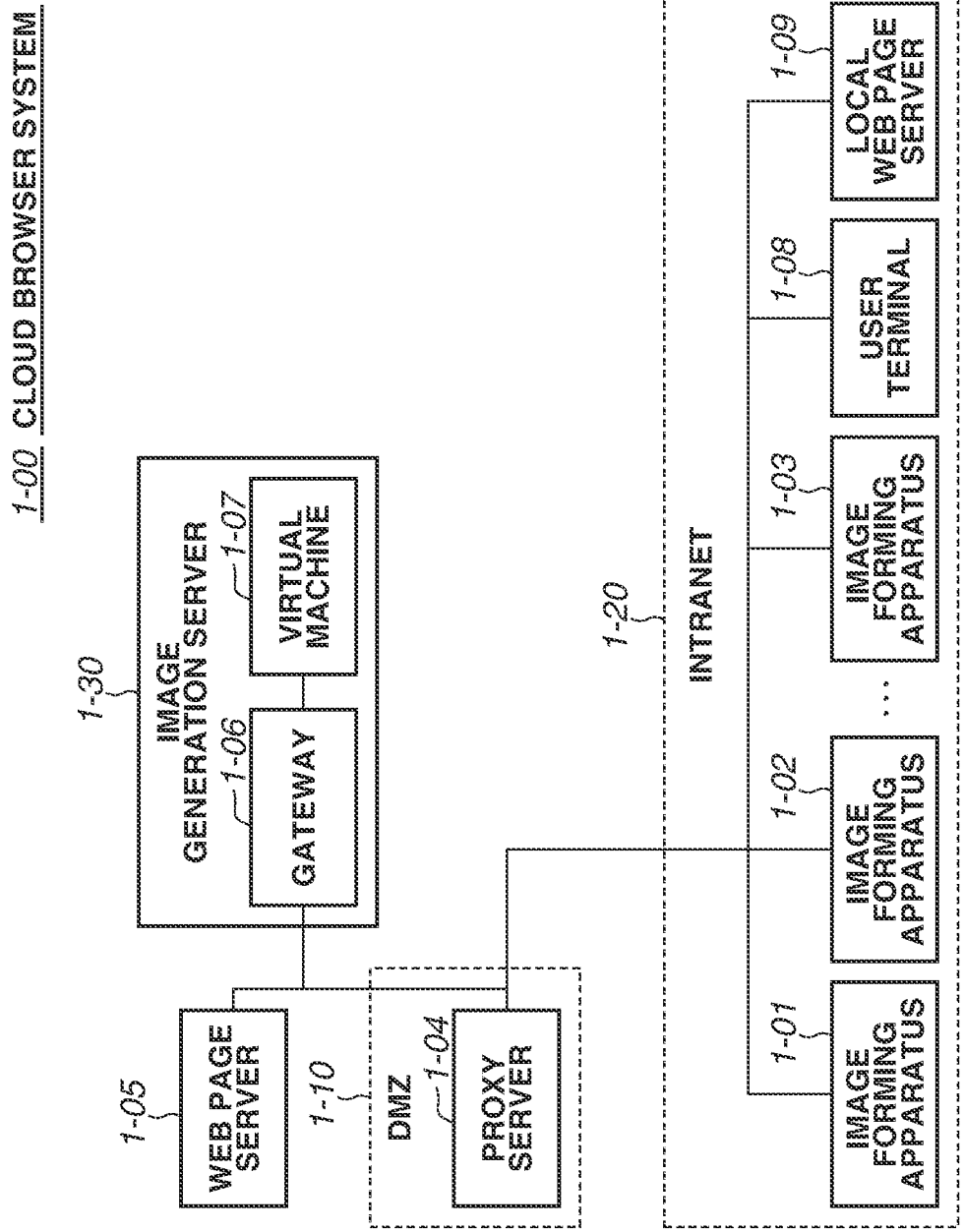

CLOUD BROWSER SETTING

☑ USE CLOUD BROWSER ～6-01

☑ USE HTTP PROXY ～6-02

Host: [ ]  Port: [ ]

☑ USE PROXY AUTHENTICATION ～6-03

ID [ ]  Password: [ ]

☑ SPECIFY URL TO BE DISPLAYED WHEN BROWSER STARTS
6-04

URL: [ ]

☑ SPECIFY HTTP HEADER FOR PROXY ～6-06

HEADER NAME: [ ]
HEADER VALUE: [ ]

FIG.7A

| SESSION ID (7-01) | URL (7-02) |
|---|---|
| 1 | https://*.*.*.*/****** |

FIG.7B

| SESSION ID (7-40) | PROXY HOST (7-41) | PROXY PORT (7-42) | PROXY AUTHENTICATION ID (7-43) | PROXY AUTHENTICATION PASSWORD (7-44) |
|---|---|---|---|---|
| 1 | localhost | 10000 | fjioajeioap | jfeiowpji32 |

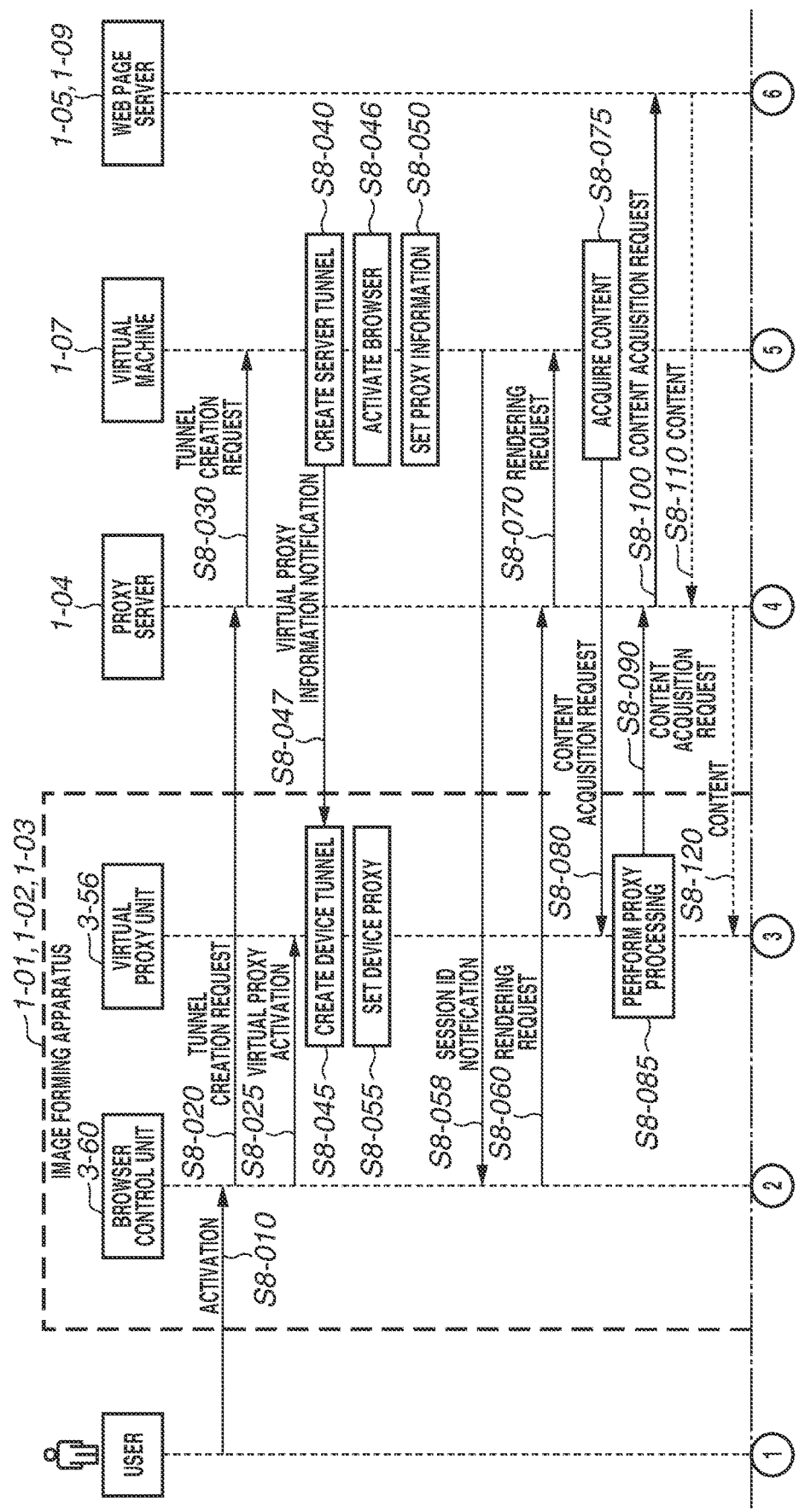

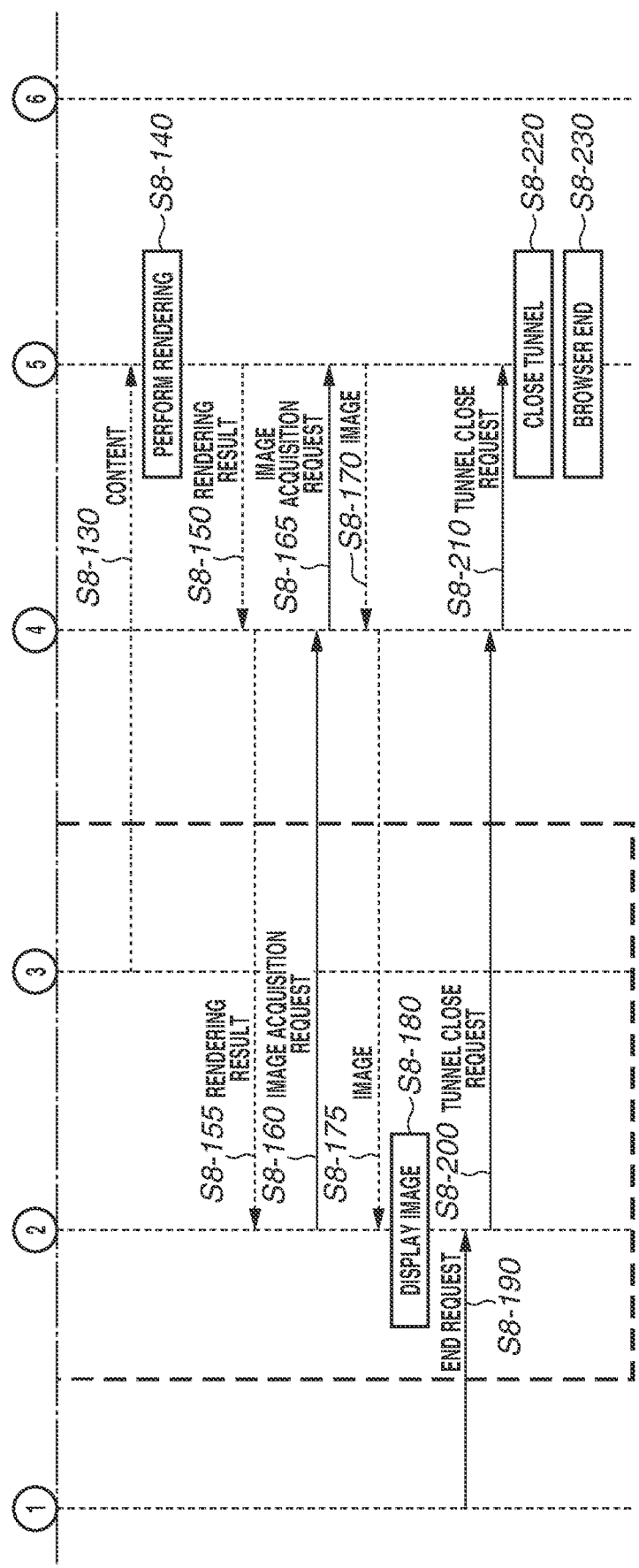

WEB BROWSING SYSTEM, COMMUNICATION TERMINAL, IMAGE GENERATION SERVER

BACKGROUND

Field of the Disclosure

The present disclosure relates to a communication terminal that is used in a Web browsing system. The communication terminal can be applied to a general-purpose information processing apparatus, such as a personal computer and a mobile terminal, in addition to an image processing apparatus, such as a printer, a scanner, a facsimile apparatus, and a multifunction peripheral thereof.

Description of the Related Art

Communication terminals, for example, an image processing apparatus (which is an example of an information processing apparatus), which is equipped with a Web browser (hereinafter, referred to as a browser) and has a function of browsing a Web page on the browser, have been known. The communication terminal that has accessed a Web page of an external service via the Web browser can expand its functions by cooperating with the external service. When the communication terminal uses such a Web browser, restricting access or recording an access history by using a proxy is sometimes used in order to ensure security in a specific environment.

In recent years, a mechanism called a cloud browser using an image generation server that generates a rendering result of a Web page on a cloud server has been studied. Japanese Patent Application Laid-Open No. 2022-41717 discusses a system in which a Web page is rendered in a virtual machine on a network different from a communication terminal and a result of the rendering is displayed on the communication terminal. In the system, processing with a high calculation load, such as analysis processing and execution processing of a Web page, is executed on the server, which leads to reduction in requirements for the specification of the communication terminal.

SUMMARY

According to an aspect of the present disclosure, a Web browsing system includes an image generation server for rendering a Web content and a communication terminal for communicating with the image generation server and displaying the Web content in accordance with a result of the rendering. The Web browsing system comprises one or more memories and one or more processors. The one or more processors and the one or more memories are configured to create a predetermined communication path between the communication terminal and the image generation server in such a manner that the image generation server is able to perform communication via a virtual proxy provided by the communication terminal, and download, to the image generation server, a Web content from a Web server via the predetermined communication path and provide a rendering result based on the Web content from the image generation server to the communication terminal.

Further features of various embodiments will become apparent from the following description of exemplary embodiments with reference to the attached drawings.

BRIEF DESCRIPTION OF THE DRAWINGS

FIG. 1 is a block diagram illustrating an overall configuration of a cloud browser system.

FIG. 6 is a diagram illustrating a cloud browser setting screen.

FIG. 7A is a diagram illustrating an example of virtual proxy information that is managed by the virtual machine. FIG. 7B is a diagram illustrating an example of association management information between a session and a browser that are managed by the virtual machine.

FIGS. 8A and 8B are sequence diagrams illustrating a procedure for using the cloud browser system.

DESCRIPTION OF THE EMBODIMENTS

Figure 2A:
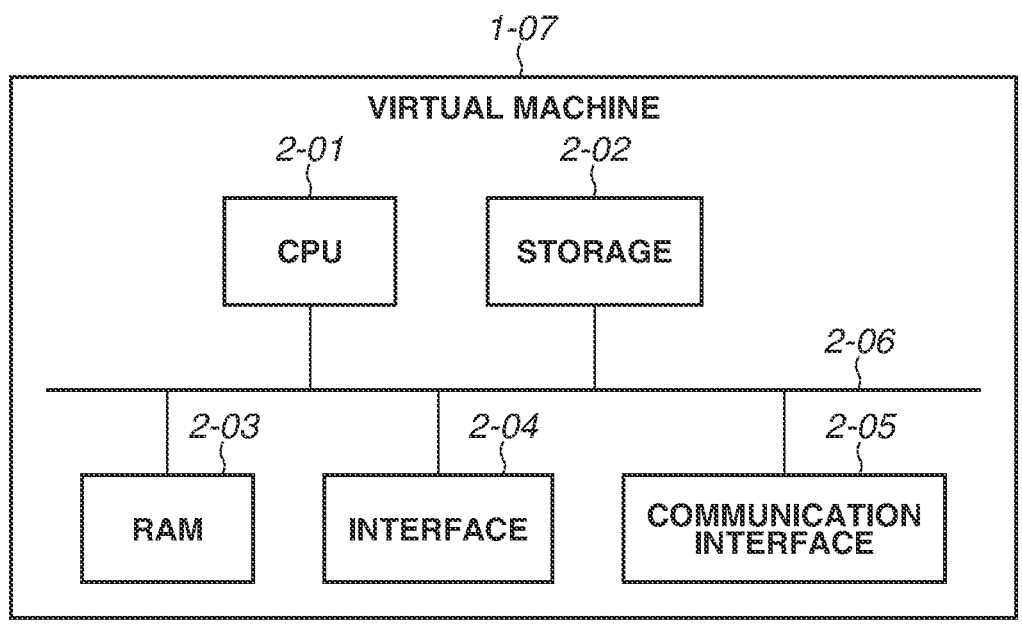
FIG. 2A is a block diagram illustrating a hardware configuration of a virtual machine.

Hereinafter, exemplary embodiments of the present disclosure will be described in detail with reference to the accompanying drawings. The scope of the present disclosure is not limited to the configurations described in the exemplary embodiments. Within a range in which the same effect is obtained, a part of the configurations or a part of the processing may be modified by being replaced with an equivalent or by being omitted.

FIG. 1 is a diagram illustrating an overall configuration of a cloud browser system 1-00. The cloud browser system 1-00 is a Web browsing system that performs rendering of a Web content on a cloud. The cloud browser system 1-00 includes a plurality of image forming apparatuses 1-01 to 1-03 and an image generation server 1-30 to which the image forming apparatuses 1-01 to 1-03 are connected.

The cloud browser system 1-00 includes a Web page server 1-05 that provides a Web page, a local Web page server 1-09, and a proxy server 1-04. While, in FIG. 1, one image generation server, which is the image generation server 1-30, is connected to three image forming apparatuses, which are the image forming apparatuses 1-01 to 1-03, any number of image forming apparatuses can be connected to the image generation server 1-30. The image generation server 1-30 is configured to provide services to the image forming apparatuses 1-01 to 1-03 in parallel or in a time-division manner. Consequently, in the cloud browser system 1-00, the image generation server 1-30 is relatively small in number in comparison with the image forming apparatuses 1-01 to 1-03. A plurality of image generation servers can also be disposed in the cloud browser system 1-00 for the purpose of distributing the load among the image generation servers, for example. Hereinafter, a relationship between the image forming apparatuses 1-01 to 1-03 and the image generation server 1-30 will be described using the image forming apparatus 1-01 as a representative of the plurality of image forming apparatuses.

The image generation server 1-30 is a cloud system that provides a service as a substitute for Web content rendering. The image generation server 1-30 includes a gateway 1-06 and a virtual machine 1-07. As will be described in detail below, a browser engine, which is a software module, operates on the virtual machine 1-07 of the image generation server 1-30. The browser engine receives a uniform resource locator (URL) transmitted from the image forming apparatus 1-01 via the gateway 1-06. Then, the browser engine accesses a Web page corresponding to the received URL via the gateway 1-06 to receive a Web content, which is for example, a HyperText Markup Language (HTML), from the Web page. Then, a different software module, which is for rendering, generates a rendering result (rendering image) of the received Web content. The rendering result is transmitted to the image forming apparatus 1-01 via the gateway 1-06.

The image forming apparatus 1-01 is an image processing apparatus (information processing apparatus, communication terminal) having various functions including, for example, a function of forming (printing) an image on a sheet (paper) and a function of transmitting image data generated by scanning to any destination. The image forming apparatus 1-01 can be either a multi-function peripheral (MFP) printer or a single function peripheral (SFP) printer. The printing method of the image forming apparatus 1-01 can be either an electrophotographic method or an inkjet method. The image forming apparatus 1-01 according to the present exemplary embodiment is characterized by browsing and displaying a Web content on the Internet by using the image generation server 1-30. Details will be described below.

The image forming apparatus 1-01 exists in an intranet 1-20 and is able to communicate with other apparatuses in the intranet 1-20. For example, the image forming apparatus 1-01 is able to access a Web page provided by a local Web page server. Further, the image forming apparatus 1-01 is able to provide a Web page to a user terminal 1-08 by functioning as a Web server.

The proxy server 1-04 is a server that monitors and restricts communication between the inside and outside of the intranet 1-20. The proxy server 1-04 performs URL filtering (Web filtering) to restrict access to a Web site. This access restriction is performed using a list of Web sites to which access is prohibited or a list of Web sites to which access is permitted. Each of the apparatuses in the intranet 1-20 is connected to the Internet via or not via the proxy server 1-04 in accordance with a setting held therein. For example, in FIG. 1, in a case where a user operates the image forming apparatus 1-01 and inputs a browsing request to browse the Web page server 1-05, the image forming apparatus 1-01 transmits an address (hereinafter referred to as a URL) of the Web page server 1-05 to the image generation server 1-30 via the proxy server 1-04. The proxy server 1-04 is configured inside a demilitarized zone (DMZ) 1-10. The DMZ 1-10 is a segment that is isolated from the intranet 1-20 in view of security enhancement.

Virtual Machine

FIG. 2A is a block diagram illustrating a hardware configuration of the virtual machine 1-07.

The virtual machine 1-07 includes a central processing unit (CPU) 2-01, a storage 2-02, a random access memory (RAM) 2-03, an interface 2-04, and a communication interface 2-05. These components are connected to each other via a bus 2-06 to communicate with each other.

The CPU 2-01 executes various kinds of processing by using computer-executable instructions and data stored in the storage 2-02, whereby the CPU 2-01 performs control of entire operation of the virtual machine 1-07 and executes or controls each process to be described below as processes being performed by the virtual machine 1-07.

The storage 2-02 stores, for example, setting data of the virtual machine 1-07, computer-executable instructions and data related to activation of the virtual machine 1-07, and computer-executable instructions and data related to basic operation of the virtual machine 1-07. The RAM 2-03 has an area in which computer-executable instructions and data loaded from the storage 2-02 and data received from an external apparatus via the communication interface 2-05 are stored. The RAM 2-03 has a work area in which the CPU 2-01 executes various kinds of processing. In the above described way, the RAM 2-03 appropriately provides various areas (storage areas).

The interface 2-04 is an interface including, for example, a display unit for displaying a result of processing performed by the CPU 2-01 with an image, characters, or the like, and an operation unit for receiving various operation inputs from the user. The display unit includes a liquid crystal screen and a touch panel screen. The operation unit includes, for example, a user interface, such as a keyboard, a mouse, and a touch panel screen.

The communication interface 2-05 is for data communication with an external apparatus.

The configuration illustrated in FIG. 2A is an example of a configuration applicable to the virtual machine 1-07, and is not intended to limit the configuration of the virtual machine 1-07 to the configuration illustrated in FIG. 2A. For example, a memory device can be further connected to the bus 2-06 in the configuration illustrated in FIG. 2A. Examples of the memory device include a hard disk drive, a universal serial bus (USB) memory, a magnetic card, an optical card, an integrated circuit (IC) card, a memory card, and a drive device (a drive device for a storage medium, such as an optical disk including a flexible disk (FD) and a compact disk (CD)). The virtual machine 1-07 is configured by a so-called virtualization technique with which various resources included in the computer system are organized into a logical unit independently of the physical configuration. More specifically, a plurality of resources can be integrated to configure the virtual machine 1-07, or one resource can be divided to configure one of the divided resources as the virtual machine 1-07. In other words, the virtual machine 1-07 can be configured using at least a part of a plurality of resources (which can be configured by a plurality of devices) of an information processing system configuring the cloud.

Figure 2B:
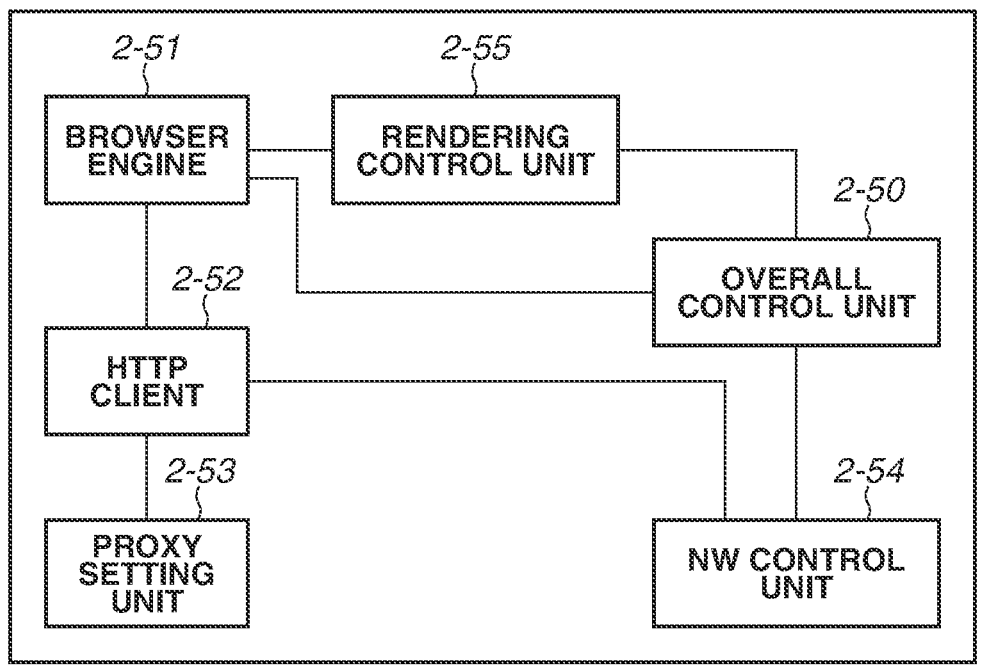
FIG. 2B is a block diagram illustrating a software configuration of the virtual machine.

FIG. 2B is a diagram illustrating a software configuration of the virtual machine 1-07 operating in the cloud browser system. An overall control unit 2-50 is a module that controls entire operation of the virtual machine 1-07 of the cloud browser system 1-00. A network (NW) control unit 2-54 is a module that performs reception of communication from the outside, transmission of data, and the like via the communication interface 2-05. The NW control unit 2-54 receives a rendering request for a Web content specified by a URL and notifies the overall control unit 2-50 of the rendering request. Rendering refers to generating an image or the like from abstract and high-level information described in a data description language or a data structure. The overall control unit 2-50 receives a notification of the rendering request, and notifies a browser engine 2-51 of the specified URL. The browser engine 2-51 sends the URL to a HyperText Transfer Protocol (HTTP) client 2-52 to acquire a Web content indicated by the URL. The HTTP client 2-52 acquires proxy information set in a proxy setting unit 2-53, and requests the NW control unit 2-54 to acquire the Web content of the specified URL via a proxy.

The NW control unit 2-54 accesses the URL via a designated proxy and acquires the Web content. The browser engine 2-51 requests a rendering control unit 2-55 to render information of the acquired Web content. The overall control unit 2-50 transmits image data rendered by the rendering control unit 2-55 to an apparatus via the NW control unit 2-54. A virtual proxy unit 3-56 (virtual proxy unit) functions as a proxy that provides a communication environment via the image forming apparatus 1-01 to the virtual machine 1-07. When the virtual proxy unit 3-56 operates, the virtual machine 1-07 accesses the Internet via the proxy server 1-04 and acquires a Web content from, for example, the Web page server 1-05. Further, when the virtual proxy unit 3-56 operates, the virtual machine 1-07 accesses the intranet 1-20 and acquires a Web content from, for example, the local Web page server 1-09.

Image Forming Apparatus

Figure 3A:
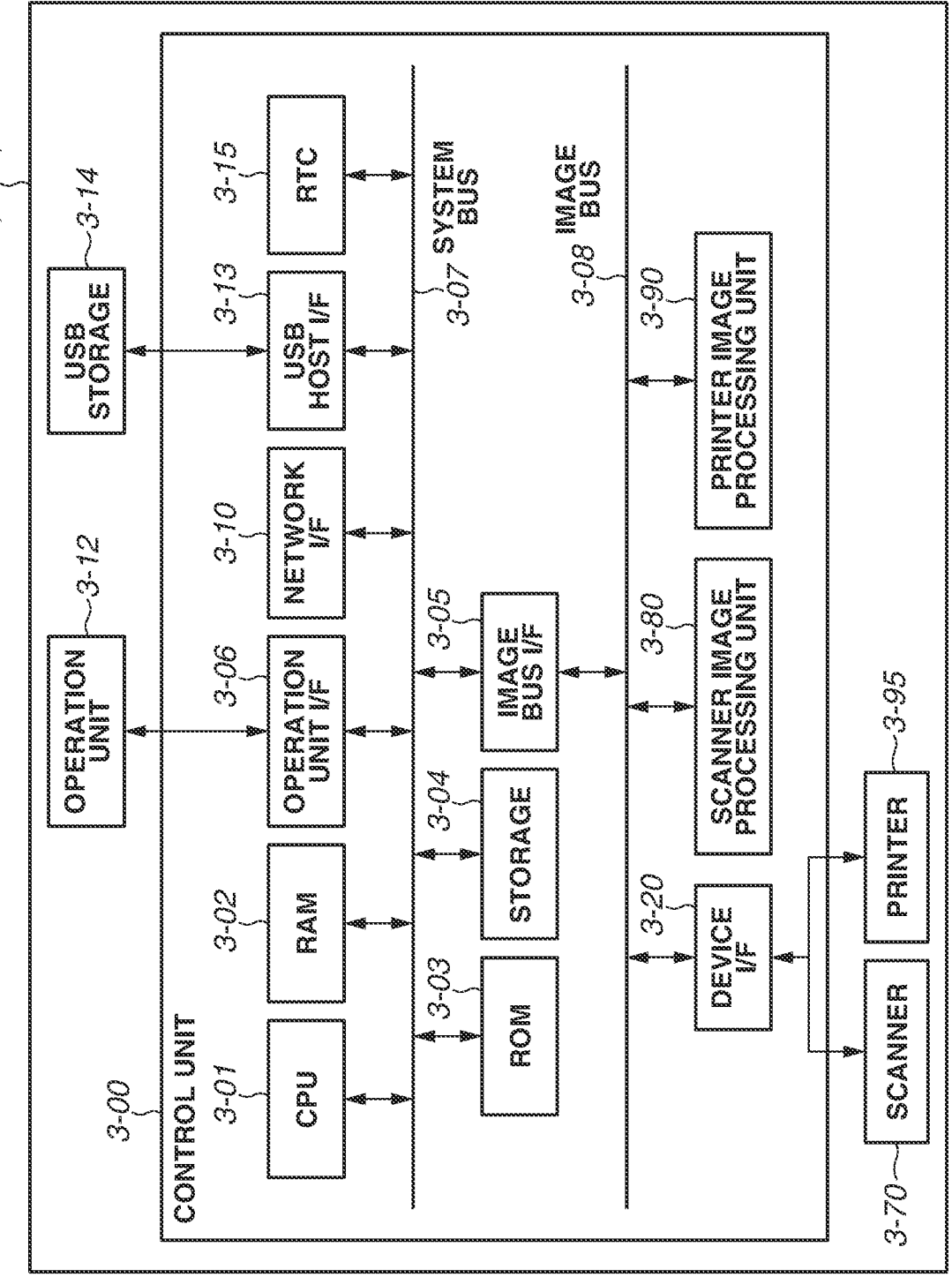
FIG. 3A is a block diagram illustrating a hardware configuration of an image forming apparatus.

FIG. 3A is a diagram illustrating a hardware configuration of the image forming apparatus 1-01. The image forming apparatus 1-01 includes a control unit 3-00, an operation unit 3-12, a USB storage 3-14, a scanner 3-70, and a printer 3-95.

The operation unit 3-12 displays information to the user and receives an input from the user.

The operation unit 3-12 includes, for example, a display, a touch panel sensor, and hardware keys.

The USB storage 3-14 is an external storage apparatus that stores data. The USB storage 3-14 is detachable from a USB-host interface (UF) 3-13.

The scanner 3-70 is an image reading unit (image reading device, image input device) that reads an image from a document.

The printer 3-95 is an image forming unit (image forming device, image output device) that forms an image on a sheet (paper).

The control unit 3-00 is a control unit having a configuration for various kinds of control in the image forming apparatus 1-01. For example, the control unit 3-00 performs control to realize a copy function of printing image data read with the scanner 3-70 by the printer 3-95.

The control unit 3-00 includes a CPU 3-01, a RAM 3-02, a read-only memory (ROM) 3-03, a storage 3-04, and an image bus I/F 3-05. These components are connected to each other via a system bus 3-07 to communicate with each other.

The control unit 3-00 also includes an operation unit I/F 3-06, a network I/F 3-10, the USB host I/F 3-13, a real-time clock (RTC) 3-15, a device I/F 3-20, a scanner image processing unit 3-80, and a printer image processing unit 3-90. These components and the image bus I/F 3-05 are connected to each other via an image bus 3-08 to communicate with each other.

The CPU 3-01 activates an operating system (OS) by a boot program stored in the ROM 3-03. The CPU 3-01 executes computer-executable instructions stored in the storage 3-04 on the OS, whereby various processes are executed. The RAM 3-02 is used as a work area of the CPU 3-01. The RAM 3-02 provides the work area and an image memory area to temporarily store image data.

The storage 3-04 is a storage unit that stores computer-executable instructions and image data. As the storage 3-04, a hard disc drive (HDD), a solid state drive (SSD), or an embedded MultiMediaCard (eMMC) can be used.

The CPU 3-01 is connected to the ROM 3-03, the RAM 3-02, the operation unit I/F 3-06, the network I/F 3-10, the USB host I/F 3-13, and the image bus I/F 3-05 via the system bus 3-07. The operation unit I/F 3-06 is an interface to the operation unit 3-12 and outputs image data to be displayed on the operation unit 3-12 to the operation unit 3-12. The operation unit I/F 3-06 transmits information input by the user using the operation unit 3-12 to the CPU 3-01. The network I/F 3-10 is an interface via which the image forming apparatus 1-01 is connected to a local area network (LAN).

The USB host I/F 3-13 is an interface unit that communicates with the USB storage 3-14. The USB host I/F 3-13 outputs data stored in the storage 3-04 to store the data in the USB storage 3-14. Further, the USB host I/F 3-13 inputs data stored in the USB storage 3-14 and transmits the input data to the CPU 3-01. A plurality of USB-devices including the USB storage 3-14 is able to be connected to the USB host I/F 3-13.

The RTC 3-15 controls the current time. Time information controlled by the RTC 3-15 is used for recording of a job input time.

The image bus I/F 3-05 is a bus bridge that connects the system bus 3-07 to the image bus 3-08, which performs high-speed image data transmission, and performs data format conversion of the image data. The device I/F 3-20, the scanner image processing unit 3-80, and the printer image processing unit 3-90 are disposed on the image bus 3-08. The scanner 3-70 and the printer 3-95 are connected to the device I/F 3-20, and the device I/F 3-20 performs synchronous/asynchronous conversion of the image data. The scanner image processing unit 3-80 corrects, processes, and edits input image data. The printer image processing unit 3-90 performs correction, resolution conversion, and the like on print output image data in accordance with the printer 3-95.

Figure 3B:
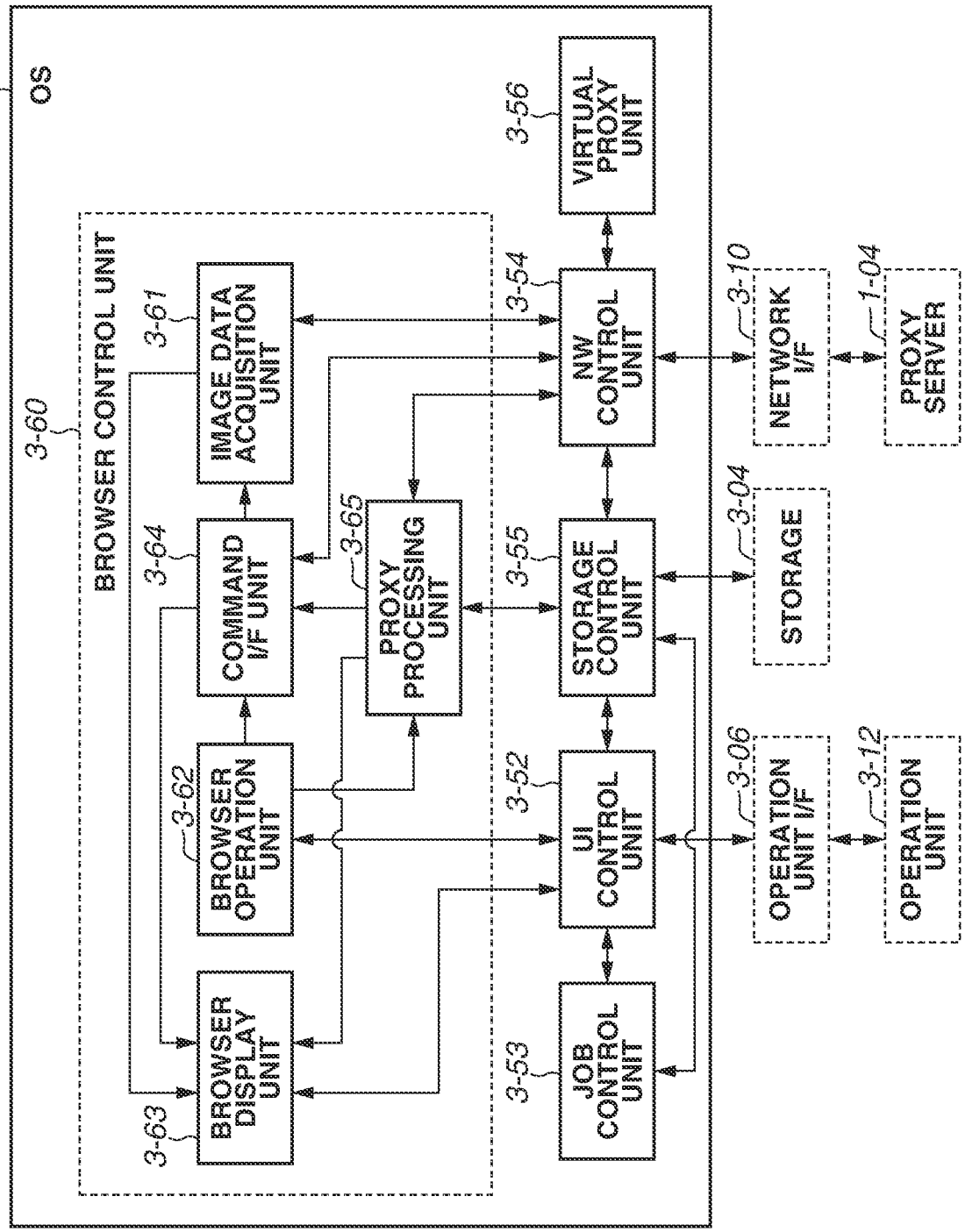
FIG. 3B is a block diagram illustrating a software configuration of the image forming apparatus.

FIG. 3B is a diagram illustrating a software configuration of the image forming apparatus 1-01.

Each unit indicated by a solid line in FIG. 3B is a software module realized by the CPU 3-01 executing computer-executable instructions loaded in the RAM 3-02.

In the computer-executable instructions, execution of each module described below is managed and controlled by an OS 3-51.

A user interface (UI) control unit 3-52 displays a screen on the operation unit 3-12 and receives an operation from the user via an operation unit I/F 3-06. The UI control unit 3-52 has a function of sending a notification to another module and controlling screen update in response to receipt of a drawing instruction from another module.

A job control unit 3-53 receives a job execution instruction from the UI control unit 3-52 and controls job processing, such as copying, scanning, and printing.

An NW control unit 3-54 controls a network I/F 3-10 in response to receipt of a communication request from a different module and controls communication with an external apparatus. In response to receipt of a notification from the external apparatus, the NW control unit 3-54 notifies the different module of a content of the notification.

A storage control unit 3-55 records and manages setting information and job information recorded in the storage 3-04. Each module disposed in the hierarchy of the OS 3-51 accesses the storage control unit 3-55 to refer to a setting value and set the setting value.

The virtual proxy unit 3-56 provides an environment for communication via a tunnel (predetermined communication path) to the virtual machine 1-07.

A browser control unit 3-60 is a sub-module included in the OS 3-51 and performs control unique to a cloud browser, which will be described below. Any number of sub-modules can be disposed in the OS 3-51.

A browser operation unit 3-62 has a function of notifying, in response to receipt of a notification of a user operation from the UI control unit 3-52, a command I/F unit 3-64 or a proxy processing unit 3-65 of a content of the user operation.

The proxy processing unit 3-65 receives the notification from the browser operation unit 3-62 and requests the storage control unit 3-55 to acquire proxy setting information. In a case where the proxy processing unit 3-65 determines that a proxy setting is enabled, based on the acquired proxy setting information, the proxy processing unit 3-65 sends a communication request to the proxy server 1-04 via the NW control unit 3-54. The proxy processing unit 3-65 has a function of receiving a response to the communication request from the NW control unit 3-54 and notifying a browser display unit 3-63 or the command I/F unit 3-64 of a processing result of a content of the response.

The command I/F unit 3-64 receives the notifications from the browser operation unit 3-62 and the proxy processing unit 3-65 and sends a communication request to communicate with the image generation server 1-30 via the NW control unit 3-54. The communication request in this processing can include notified information. Examples of the notified information include a user operation, such as text input, link pressing, scrolling, and zooming. For example, in a case of the text input, examples of the notified information include a URL. In a case of the link pressing, examples of the notified information include coordinates on the operation unit 3-12 where pressing has been performed, and in a case of the scrolling and the zooming, examples of the notified information include a character string associated with each of the operation. Further, the command I/F unit 3-64 accepts communication from the image generation server 1-30 via the NW control unit 3-54. The command I/F unit 3-64 processes a received content and sends a notification to an image data acquisition unit 3-61 or the browser display unit 3-63.

The image data acquisition unit 3-61 receives a URL of the storage 2-02 in which a rendering result is stored, from the command I/F unit 3-64. The image data acquisition unit 3-61 acquires an image from the URL and sends the image to the browser display unit 3-63.

The browser display unit 3-63 receives the image from the image data acquisition unit 3-61 and instructs the UI control unit 3-52 to render the image. In response to receipt of the notifications from the command I/F unit 3-64 and the proxy processing unit 3-65, the browser display unit 3-63 instructs the UI control unit 3-52 to render a screen on which a message corresponding to the notification is displayed.

Procedure for Using System

A procedure for using the cloud browser system 1-00 having the above-described configuration will be described. FIGS. 8A and 8B are sequence diagrams illustrating a procedure for using the cloud browser system 1-00.

FIGS. 8A and 8B illustrate processing among the user, the browser control unit 3-60, the virtual proxy unit 3-56, the proxy server 1-04, the virtual machine 1-07, and the Web page server 1-05, the local Web page server 1-09 when the cloud browser system 1-00 is used.

Figure 4:
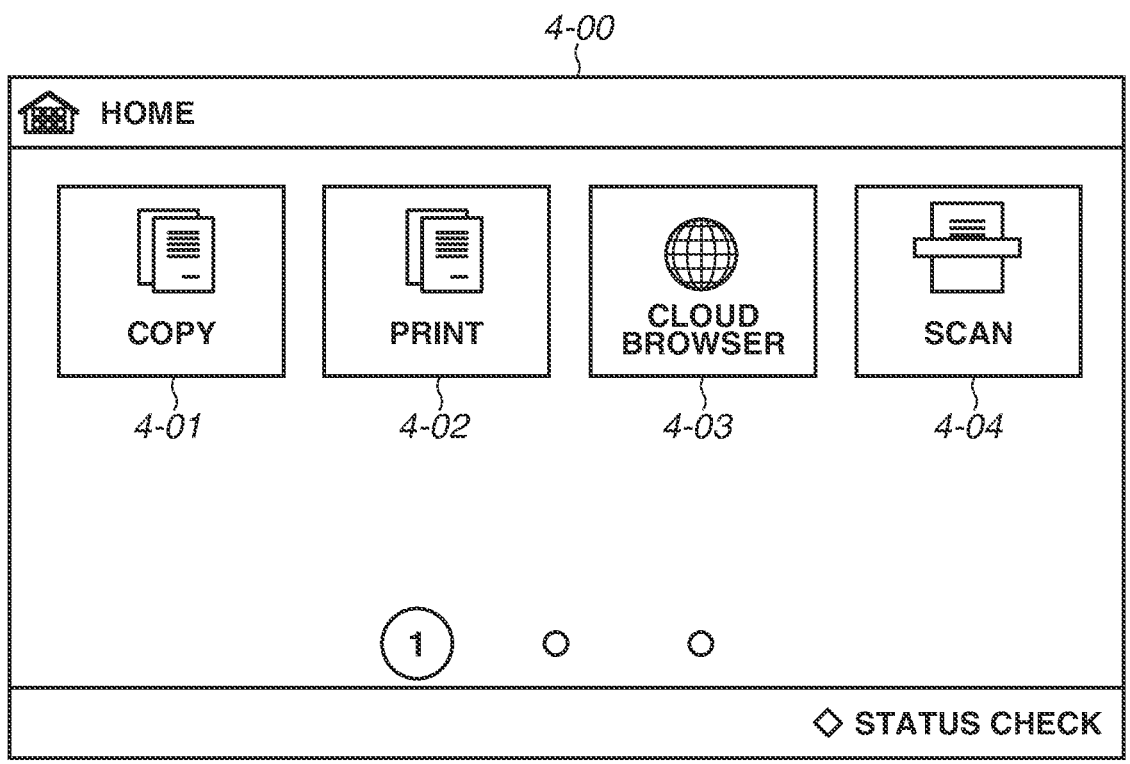
FIG. 4 is a diagram illustrating an example of a menu screen of the image forming apparatus.

When using the cloud browser system 1-00, the user operates the operation unit 3-12 of the image forming apparatus 1-01 to call a cloud browser function. FIG. 4 is a diagram illustrating a menu screen 4-00 displayed on the image forming apparatus 1-01. The menu screen 4-00 is generated by the CPU 3-01 executing computer-executable instructions for configuring the UI control unit 3-52 and is displayed on the operation unit 3-12. A button 4-01 is a button related to a copy function. A button 4-02 is a button related to a print function. A button 4-03 is a button related to a cloud browser. A button 4-04 is a button related to a scan function. In a case where a button is selected from among the buttons 4-01 to 4-04, a function corresponding to the selected button is called. In step S8-010, in a case where the button 4-03 is selected, the browser control unit 3-60 is activated, and a browser screen 5-00 is displayed on the operation unit 3-12.

The browser screen 5-00 includes a back button 5-01, a forward button 5-02, an address bar 5-03, and a setting button 5-04. Below the items, a content area 5-05 in which a rendering result of a Web content is displayed is disposed. Roles of the items are similar to those of existing browsers.

Figure 5:
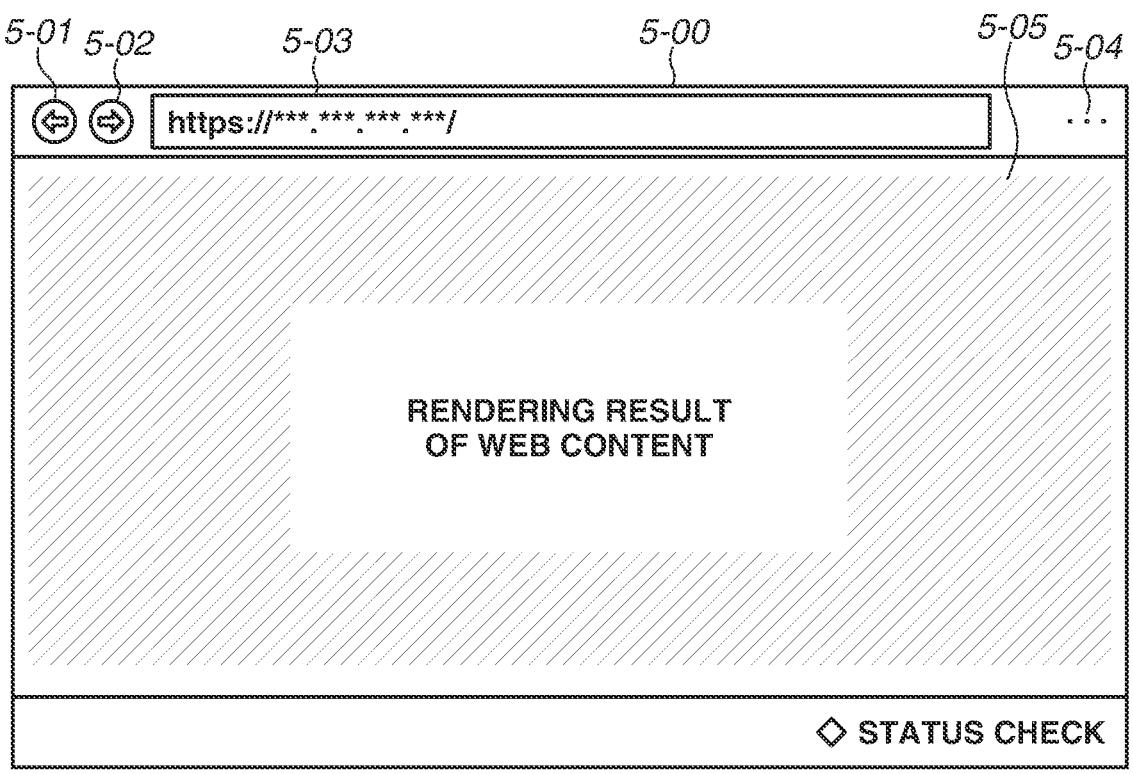
FIG. 5 is a diagram illustrating a configuration of a cloud browser screen.

After the browser control unit 3-60 is activated, nothing is displayed in the content area 5-05 until a URL is input. Alternatively, like with an existing browser, a default URL can be registered in an item in the address bar 5-03, and a rendering result of a Web content of the default URL can be displayed at the time of activation. FIG. 5 illustrates an example in which a rendering result of a Web content acquired from a Web page indicated by the URL "https://*.*.*.*/" is displayed.

In steps S8-020 and S8-030, the browser control unit 3-60 accesses the virtual machine 1-07 via the proxy server 1-04, and requests creation of a tunnel between the image forming apparatus 1-01 and the virtual machine 1-07. A tunnel to be described below is created on this communication session. In a case where a proxy is not set, the image forming apparatus 1-01 communicates with the virtual machine 1-07 not via the proxy server 1-04.

In step S8-025, the browser control unit 3-60 activates a virtual proxy function. Details of the virtual proxy function will be described below.

In step S8-040, the virtual machine 1-07 having received the tunnel creation request in step S8-030 executes server tunnel creation processing to create a tunnel on the communication session. Meanwhile, in step S8-047, the virtual proxy unit 3-56 receives virtual proxy information, and in step S8-045, the virtual proxy unit 3-56 executes device tunnel creation processing. Then, in step S8-055, the virtual proxy unit 3-56 sets a device proxy setting. Details of the tunnel creation processing will be described below with reference to FIG. 10.

In the above described tunnel creation processing, the virtual proxy information is determined. FIG. 7B is a diagram illustrating an example of the virtual proxy information. The virtual proxy information includes a session identifier (ID) 7-40, a proxy host 7-41, a proxy port 7-42, a proxy authentication ID 7-43, and a proxy authentication password 7-44 (password). The session ID 7-40 is to identify a client that uses the virtual machine 1-07. The proxy host 7-41 and the proxy port 7-42 indicate information on a virtual proxy that performs access through the tunnel created by the above-described tunnel creation processing.

The proxy authentication ID 7-43 and the proxy authentication password 7-44 indicate authentication information on the virtual proxy.

In step S8-046, the virtual machine 1-07 activates the browser engine 2-51.

In step S8-050, the virtual machine 1-07 sets proxy information in the proxy setting unit 2-53 as setting information to be used for the browser engine 2-51 activated in step S8-046. In this processing, a host, a port, a proxy authentication ID, and a password based on the above-described virtual proxy information are set as settings of the browser engine 2-51.

A general Web site includes link information on a plurality of Web contents including cascading style sheets (CSS), JavaScript, images, and the like, in the HTML. A browser uses the pieces of the link information to perform HTTP access and acquires a Web content. Alternatively, the HTTP access can be dynamically performed based on a loaded JavaScript. These HTTP accesses are also performed in the browser engine 2-51. Consequently, all the HTTP accesses are performed through the tunnel between the image forming apparatus 1-01 and the virtual machine 1-07 according to the setting set in step S8-050.

In step S8-058, the virtual machine 1-07 notifies the browser control unit 3-60 of the session ID 7-40 determined in step S8-040. In steps S8-060 and S8-070, the browser control unit 3-60 accesses the virtual machine 1-07 via the proxy server 1-04, and notifies the virtual machine 1-07 of a URL of a Web content to be rendered to request rendering.

As illustrated in FIG. 7A, the rendering request includes a session ID 7-01 and a URL 7-02 of the Web content. The session ID 7-01 specifies the same ID of the session ID 7-40 notified in step S8-058. In step S8-075, in response to receipt of the rendering request, the virtual machine 1-07 causes the browser engine 2-51 to acquire a Web content of the URL 7-02 contained in the rendering request.

In step S8-080, the proxy setting unit 2-53 issues a Web content acquisition request for the URL 7-02 to the proxy set in step S8-050. The Web content acquisition request in step S8-080 is notified to the virtual proxy unit 3-56 through the tunnel created by the tunnel creation processing in steps S8-040 and S8-045. In step S8-085, the virtual proxy unit 3-56 having received the Web content acquisition request in step S8-080 performs proxy processing, which will be described in detail below with reference to FIG. 9. In steps S8-090 and S8-100, a content acquisition request is sent to the Web page server 1-05 that has been specified by the URL in the proxy processing in step S8-085. In this processing, determination of whether communication is to be performed via the proxy server 1-04 or to be directly performed with the Web page server 1-05 is changed in accordance with the setting. In steps S8-110 and S8-120, the Web page server 1-05 having received the content acquisition request in step S8-100 responds with the Web content of the specified URL.

In step S8-130, the virtual proxy unit 3-56 returns the received Web content to the virtual machine 1-07. In step S8-140, the virtual machine 1-07 renders the received Web content by the proxy setting unit 2-53 and stores the rendered image.

In steps S8-150 and S8-155, the virtual machine 1-07 responds with a URL for access to the stored rendered image.

In steps S8-160 and S8-165, the browser control unit 3-60 issues an image acquisition request to acquire the rendered image from the URL received in step S8-155.

In steps S8-170 and S8-175, the virtual machine 1-07 responds with the rendered image corresponding to the URL of the image acquisition request. In step S8-180, the browser control unit 3-60 having acquired the rendered image displays the rendered image on the operation unit 3-12. In step S8-190, the user who has used the cloud browser function issues an end request to the browser control unit 3-60.

In steps S8-200 and S8-210, in response to receipt of the end request, the browser control unit 3-60 requests the virtual machine 1-07 to close the tunnel. In other words, the tunnel close request is sent when the cloud browser function is ended. In response to receipt of the tunnel close request, in step S8-220, the virtual machine 1-07 closes the tunnel. In step S8-230, the virtual machine 1-07 ends the proxy setting unit 2-53.

With the above described operation, even in a case where the image forming apparatus 1-01 and the image generation server 1-30 are on different networks, the image forming apparatus 1-01 behaves as if the image forming apparatus 1-01 directly accesses the target Web page server. Communication via the proxy server 1-04 is thus possible, whereby security is able to be guaranteed. Even in a case of a content provided by the local Web page server 1-09 in a private network, such as the intranet 1-20, the virtual machine 1-07 is able to access, render, and provide the content to the image forming apparatus 1-01.

Proxy Setting

FIG. 6 is a diagram illustrating a setting screen 6-00 of the cloud browser system 1-00. The setting screen 6-00 is provided as a Web page by the image forming apparatus 1-01 using a server function, and thus can be browsed from an external apparatus. For example, the user terminal 1-08 connected to the image forming apparatus 1-01 via the same network line is able to display the setting screen 6-00 by inputting a specific URL to the Web browser. Processing in step S10-010 is performed using the setting screen 6-00. The setting screen 6-00 can be directly displayed on the operation unit 3-12 without being converted into Web page information.

The setting screen 6-00 includes items 6-01, 6-02, 6-03, 6-04, and 6-06.

The item 6-01 is a setting item for setting ON/OFF for use of the cloud browser function. In a case where a check box of the item 6-01 is checked, the use of the cloud browser function is turned ON, and the button 4-03 for the cloud browser is displayed on the menu screen 4-00. In a case where the check box of the item 6-01 is unchecked, the use of the cloud browser function is turned OFF, and the button 4-03 for the cloud browser is removed from the menu screen 4-00. The item 6-01 is an item to be operated first on the setting screen 6-00, and checking the check box of the item 6-01 causes the other items to be operable.

The item 6-02 is a setting item for setting whether a proxy is to be used. In an environment in which a proxy is used for Internet access, a check box of the item 6-02 is checked, and host and port information of the proxy is set.

The item 6-03 is a setting item for setting authentication information of proxy authentication. In an environment in which authentication requires use of the proxy, a check box of the item 6-03 is checked, and proxy authentication information, such as an ID and a password, is specified.

The item 6-04 is a setting item for setting a start-up URL. In a case where a check box of the item 6-04 is checked and a URL is input to the input field, access to the specified URL is automatically performed when a cloud browser application is activated. The information set in the item 6-04 is notified via the network I/F 3-10 and recorded in the storage 3-04.

The item 6-06 is an item for specifying an HTTP header to be used when the image forming apparatus 1-01 sends an HTTP request to the image generation server 1-30. In a case where the item 6-06 is enabled, the image forming apparatus 1-01 additionally sets a specified HTTP header (HTTP header for proxy) in an HTTP header that is used when an HTTP request is sent to the image generation server 1-30, and performs communication. With this setting, determination of which access among HTTP access via the proxy server 1-04 is destined for the image generation server 1-30 is able to be performed. In a case where Web access is restricted using a proxy server, the determination is able to be used to identify which access is to be restricted, whereby the effect of appropriately restricting access can be expected.

Control

Figure 10:
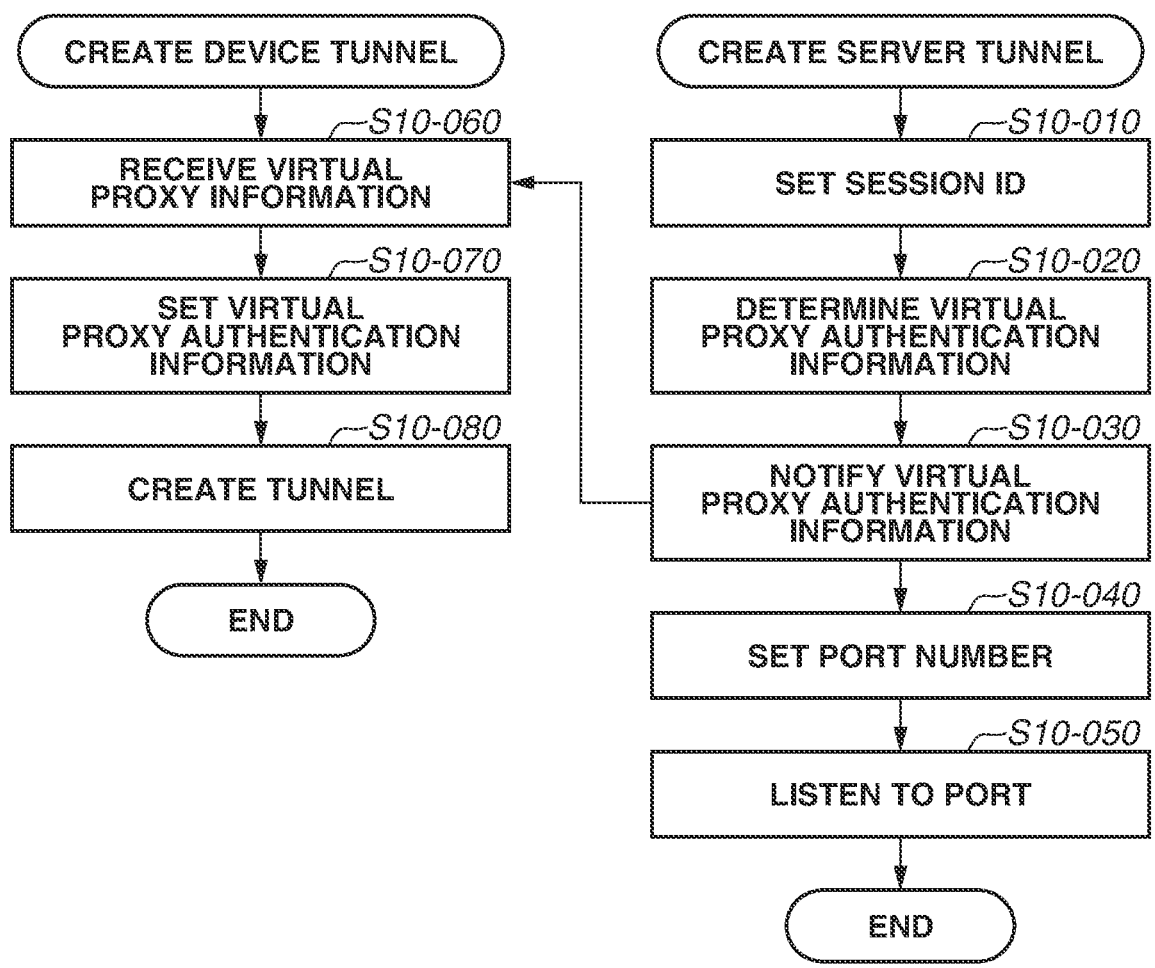
FIG. 10 is a flowchart illustrating processing for creating a tunnel between the image forming apparatus and the virtual machine.

FIG. 10 is a flowchart illustrating processing for creating a tunnel between the image forming apparatus 1-01 and the virtual machine 1-07. Details of the server tunnel creation processing in step S8-040 and the device tunnel creation processing in step S8-045 will be described with reference to FIG. 10. In the processing illustrated in FIG. 10, processing that is performed by the image forming apparatus 1-01 is realized by the control unit 3-00. More specifically, the processing is implemented by the CPU 3-01 loading computer-executable instructions stored in the ROM 3-03 or the storage 3-04 into the RAM 302 and executing the computer-executable instructions. In the processing illustrated in FIG. 8, the processing of the virtual machine 1-07 is implemented by the CPU 2-01 loading computer-executable instructions stored in the storage 2-02 into the RAM 2-03 and executing the computer-executable instructions.

In the server tunnel creation processing in step S8-040, in step S10-010, the CPU 2-01 sets a session ID to manage a tunnel. The session ID set in step S10-010 is managed in the item of the session ID 7-40 as shown in FIG. 7A. The session ID can be in any format as long as the session ID is unique information.

In step S10-020, in order to determine authentication information (ID and password) to be used by the virtual proxy unit 3-56, the CPU 2-01 executes a virtual proxy authentication information determination process.

The virtual proxy authentication information (ID and password) is generated using, for example, a random character string or a hash function. The generated virtual proxy authentication information is managed in the items of the proxy authentication ID 7-43 and the proxy authentication password 7-44 in association with the set session ID. In step S10-030, the CPU 2-01 notifies the image forming apparatus 1-01 of the determined virtual proxy authentication information.

In step S10-040, the CPU 2-01 sets a port number to be used for communication with the virtual proxy unit 3-56. The port number is managed in the item of the proxy port 7-42 in association with the set session ID.

In step S10-050, the CPU 2-01 listens to a transmission control protocol (TCP) port of the set port number. In a case where access to the port is performed, a setting to communicate with the virtual proxy unit 3-56 is set. The server tunnel creation processing in step S8-040 has been described above in detail.

On the other hand, in the device tunnel creation processing in step S8-045, in step S10-060, the CPU 3-01 receives the virtual proxy authentication information (ID and password).

In step S10-070, the CPU 3-01 sets the virtual proxy authentication information as authentication information of a virtual proxy. In step S10-080, the CPU 3-01 creates a tunnel such that proxy access from the virtual machine 1-07 is received by the virtual proxy unit 3-56.

As described above, the tunnel between the virtual machine 1-07 and the image forming apparatus 1-01 is created. In the present exemplary embodiment, the virtual machine 1-07 executes the virtual proxy authentication determination process in step S10-020, and the image forming apparatus 1-01 executes the virtual proxy information reception process in step S10-060. Alternatively, the roles of the virtual machine 1-07 and the image forming apparatus 1-01 can be reversed.

Figure 9:
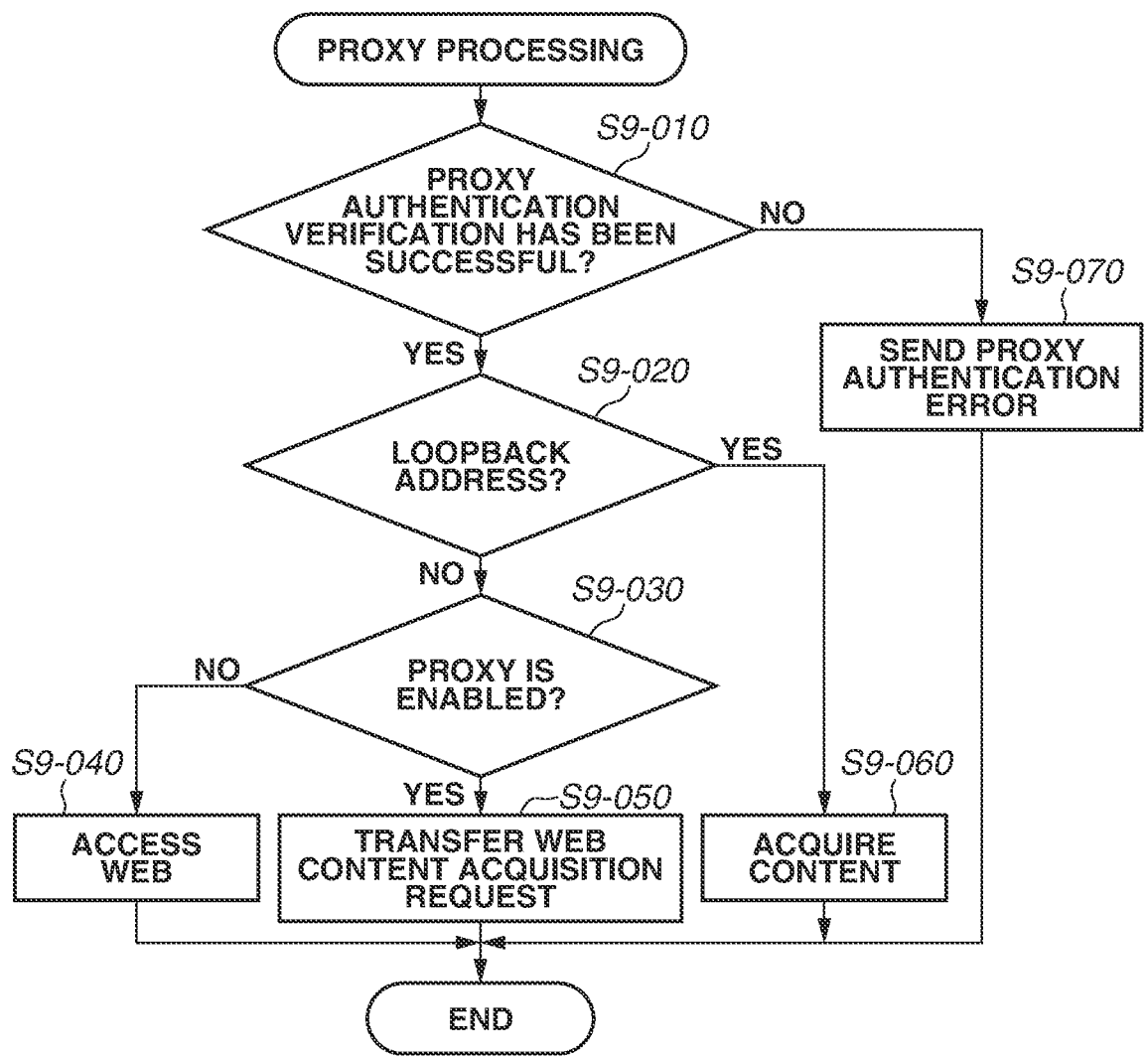
FIG. 9 is a flowchart illustrating proxy processing that is performed by the image forming apparatus.

The proxy processing in step S8-085 will be described in detail. FIG. 9 is a flowchart illustrating the proxy processing that is performed by the image forming apparatus 1-01. Each process in the flowchart is implemented by the control unit 3-00. More specifically, each process is performed by the CPU 3-01 loading computer-executable instructions stored in the ROM 3-03 or the storage 3-04 into the RAM 302 and executing the computer-executable instructions.

The proxy processing in step S8-085 is executed by the virtual proxy unit 3-56 in response to receipt of the Web content acquisition request from the virtual machine 1-07.

In step S9-010, the CPU 3-01 verifies whether the proxy authentication information added to the Web content acquisition request and the proxy authentication information set in step S10-070 are correct. In a case where the verification has been successful (YES in step S9-010), the CPU 3-01 advances the processing to step S9-020. In a case where the verification has not been successful (NO in step S9-010), the CPU 3-01 advances the processing to step S9-070.

In step S9-020, the CPU 3-01 checks whether the URL in the Web content acquisition request is a URL indicating a Web content of the image forming apparatus 1-01 (loopback address). In a case where the URL is of the image forming apparatus 1-01 (YES in step S9-020), the processing proceeds to step S9-060. In a case where the URL is not of the image forming apparatus 1-01 (NO in step S9-020), the processing proceeds to step S9-030.

In step S9-030, the CPU 3-01 checks whether the proxy use setting is enabled. In a case where the use of the proxy is enabled (YES in step S9-030), the processing proceeds to step S9-050. In a case where the use of the proxy is not enabled (NO in step S9-030), the processing proceeds to step S9-040.

In step S9-040, the CPU 3-01 performs processing to acquire a content of the requested URL not via a proxy and ends the processing.

In step S9-050, the CPU 3-01 transfers the Web content acquisition request to the set proxy and ends the processing.

In step S9-060, the CPU 3-01 acquires (downloads) a Web content provided by the image forming apparatus 1-01 and ends the processing.

In step S9-070, the CPU 3-01 responds with an authentication error and ends the processing.

As described above, the Web content acquisition request from the virtual machine 1-07 can be appropriately processed.

As described above, according to the present exemplary embodiment, even in a case where the image forming apparatus 1-01 and the image generation server 1-30 are connected to different networks, the image forming apparatus 1-01 is able to behave as if the image forming apparatus 1-01 directly accesses a target Web page server. Therefore, communication via the proxy server 1-04 is able to be performed, and security can be guaranteed. Further, even in a case of a content provided by the local web page server 1-09 in a private network, such as the intranet 1-20, the virtual machine 1-07 is able access, render, and provide the content to the image forming apparatus 1-01.

Other Embodiments

Some embodiments are not limited to the above-described exemplary embodiments, and various modifications, including organic combinations of the embodiments, can be made on the basis of the gist of the present disclosure, which are not excluded from the scope of the present disclosure.

Figure 11A:
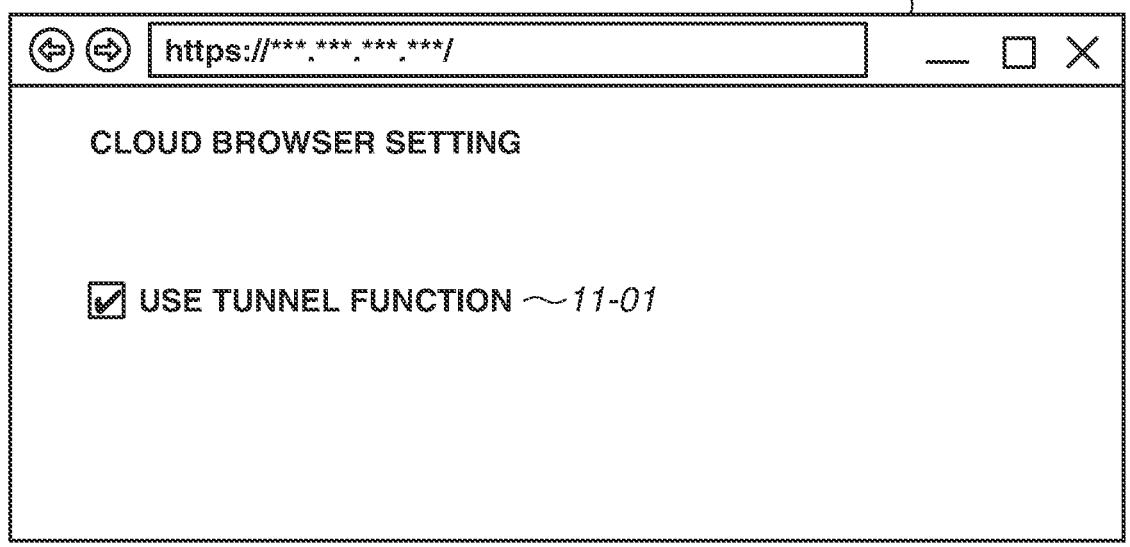
FIG. 11A is a diagram illustrating a cloud browser setting screen according to another exemplary embodiment.
Figure 11B:
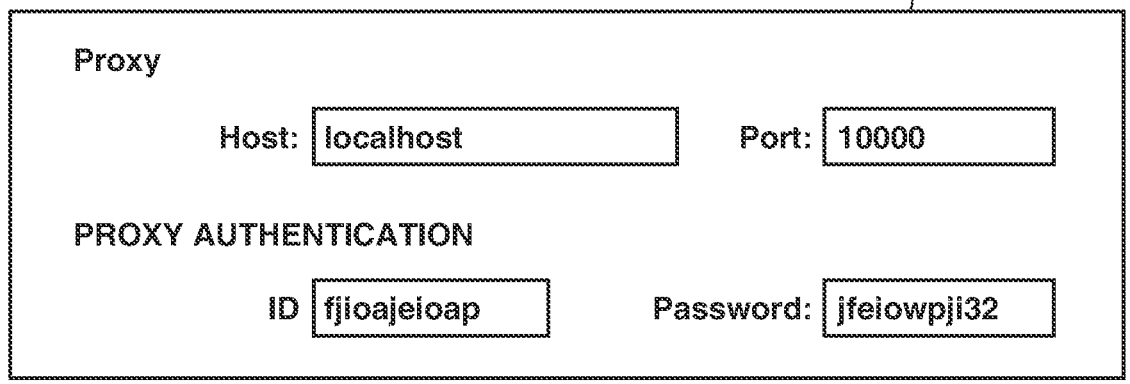
FIG. 11B is a diagram illustrating a virtual machine setting screen according to the another exemplary embodiment.

In the present exemplary embodiment, the tunnel function is used when the cloud browser system is used. However, the use of the tunnel function can be switched between ON and OFF in accordance with the setting. FIG. 11A is a diagram illustrating a setting screen 11-00 of a cloud browser according to another exemplary embodiment. The setting screen 11-00 includes an item 11-01. The item 11-01 is for setting of whether a tunnel between the image forming apparatus 1-01 and the virtual machine 1-07 is to be created. In a case where the item 11-01 is enabled, the operation as in the procedure of FIGS. 8A and 8B is performed. Thus, in a case where the virtual machine 1-07 accesses the Web page server 1-05, communication via the proxy server 1-04, which is normally inaccessible, is able to be performed by using the tunnel. Further, by using the tunnel, access to the local Web page server 1-09, which is not able to be accessed normally, is able to be performed. In a case where the item 11-01 is disabled, the processing of steps S8-020 and S8-030 is not executed. Consequently, a tunnel is not created between the image forming apparatus 1-01 and the virtual machine 1-07, and the virtual machine 1-07 directly accesses the Web page server 1-05 to acquire the Web content.

In the present exemplary embodiment, the proxy authentication for the tunnel function is automatically performed without a user operation. Alternatively, a manual setting method involving a user operation can also be adopted for the proxy authentication for the tunnel function. For example, the image forming apparatus 1-01 generates an ID and a password and displays the ID and the password on the setting screen 11-00. The user notes the ID and the password and inputs the ID and the password to a setting screen 11-50 of the virtual machine 1-07. Such a method can also be used to exchange the proxy authentication information to be used for creation of the tunnel.

Some embodiment(s) of the present disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The present disclosure can be applied to a system constituted by a plurality of devices or an apparatus constituted by a single device. For example, a part of the software module can be configured to be executed by an external server, and the function can be realized by acquiring a result processed by the external server.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2022-118398, which was filed on Jul. 26, 2022 and which is hereby incorporated by reference herein in its entirety.

What is claimed is:

1. A Web browsing system including an image generation server for rendering a Web content and a communication terminal for communicating with the image generation server and displaying the Web content in accordance with a result of the rendering, the Web browsing system comprising:
   one or more memories; and
   one or more processors, wherein the one or more processors and the one or more memories are configured to:
   create a predetermined communication path between the communication terminal and the image generation server in such a manner that the image generation server is able to perform communication via a virtual proxy provided by the communication terminal; and
   download, to the image generation server, a Web content from a Web server via the predetermined communication path and provide a rendering result based on the Web content from the image generation server to the communication terminal,
   wherein the virtual proxy transfers a content acquisition request from the image generation server to a predetermined proxy.

2. The Web browsing system according to claim 1, wherein the virtual proxy transmits a Web content provided by the communication terminal to the image generation server, on a basis that a loopback address is specified as an access destination of the image generation server via the predetermined communication path.

3. The Web browsing system according to claim 1, wherein the one or more processors and the one or more memories are further configured to add a HyperText Transfer Protocol (HTTP) header for a proxy via which the communication terminal accesses the image generation server.

4. The Web browsing system according to claim 1, wherein the predetermined communication path is created when a browser function of the communication terminal is activated and is closed when the browser function is ended.

5. The Web browsing system according to claim 1, wherein the virtual proxy requires an authentication identification (ID) and a password.

6. The Web browsing system according to claim 5, wherein the authentication ID and the password are determined by the image generation server.

7. The Web browsing system according to claim 1, wherein the communication terminal includes an image forming unit that forms an image on a sheet.

8. The Web browsing system according to claim 1, wherein the communication terminal includes an image reading unit that reads an image from a document.

9. The Web browsing system according to claim 1, wherein the communication terminal belongs to an intranet.

10. The Web browsing system according to claim 9 wherein the predetermined proxy restricts communication between inside and outside of the intranet.

11. The Web browsing system according to claim 1, wherein the predetermined proxy is a proxy that has been registered in advance.

12. A communication terminal capable of communicating with an image generation server that renders a Web content, the communication terminal communicating with the image generation server and displaying the Web content based on a result of the rendering, the communication terminal comprising:
  one or more memories; and
  one or more processors, wherein the one or more processors and the one or more memories are configured to:
    provide a virtual proxy and create a predetermined communication path to the image generation server in such a manner that the image generation server is able to perform communication via the virtual proxy; and
    acquire, from the image generation server, the result of the rendering of the Web content downloaded to the image generation server via the predetermined communication path,
  wherein the virtual proxy transfers a content acquisition request from the image generation server to a predetermined proxy.

13. An image generation server for rendering a Web content, the image generation server providing a result of rendering of the Web content to a communication terminal, the image generation server comprising:
  one or more memories; and
  one or more processors, wherein the one or more processors and the one or more memories are configured to:
    create a predetermined communication path to the communication terminal in such a manner that communication via a virtual proxy provided by the communication terminal is able to be performed; and
    download the Web content from a Web server via the predetermined communication path and provide the result of the rendering based on the Web content to the communication terminal,
  wherein the virtual proxy transfers a content acquisition request from the image generation server to a predetermined proxy.

* * * * *